A. FAY.
APPARATUS FOR OPERATING UPON COMPOSITE SUBSTANCES.
APPLICATION FILED AUG. 30, 1915.
1,177,176.
Patented Mar. 28, 1916.
3 SHEETS—SHEET 1.
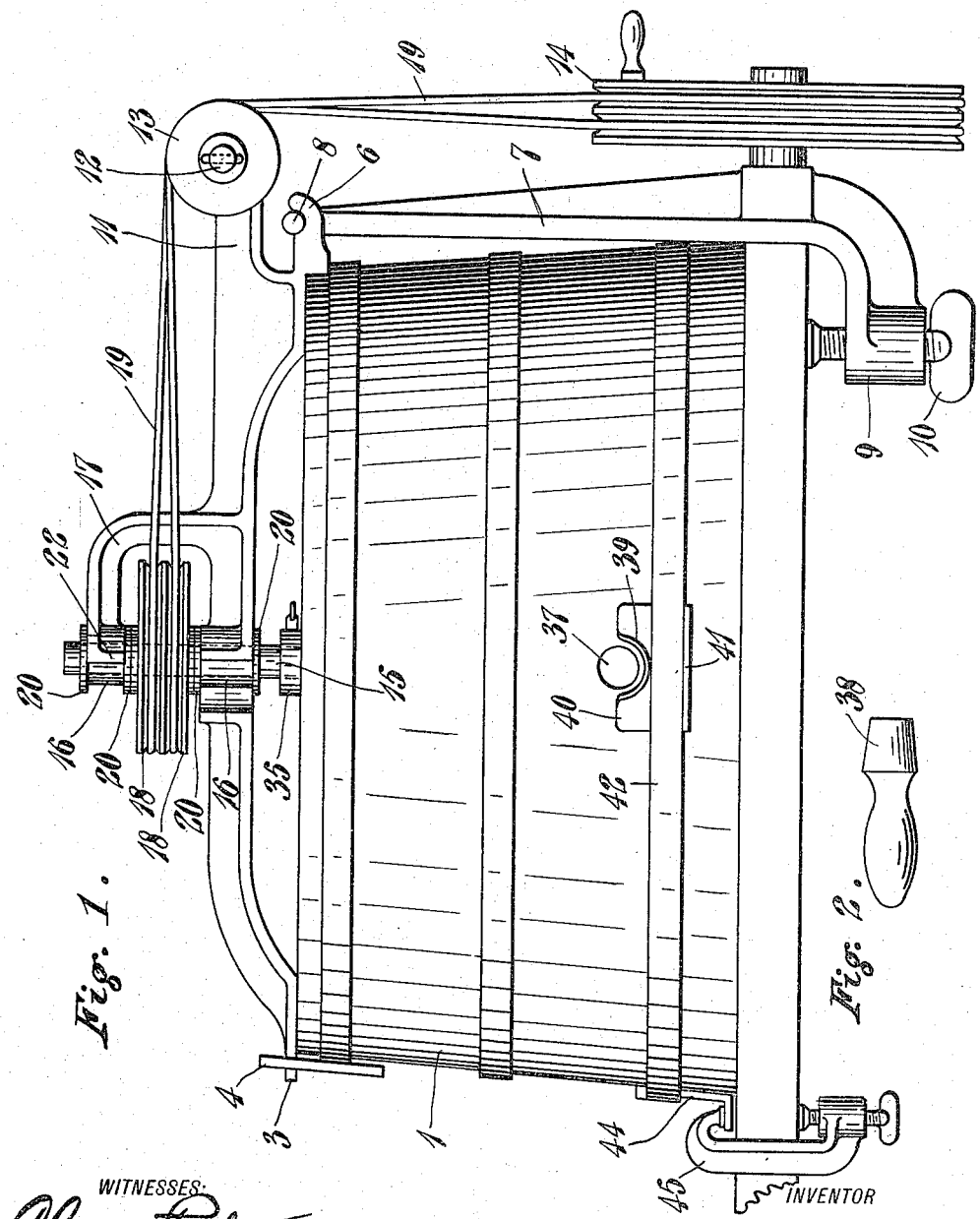

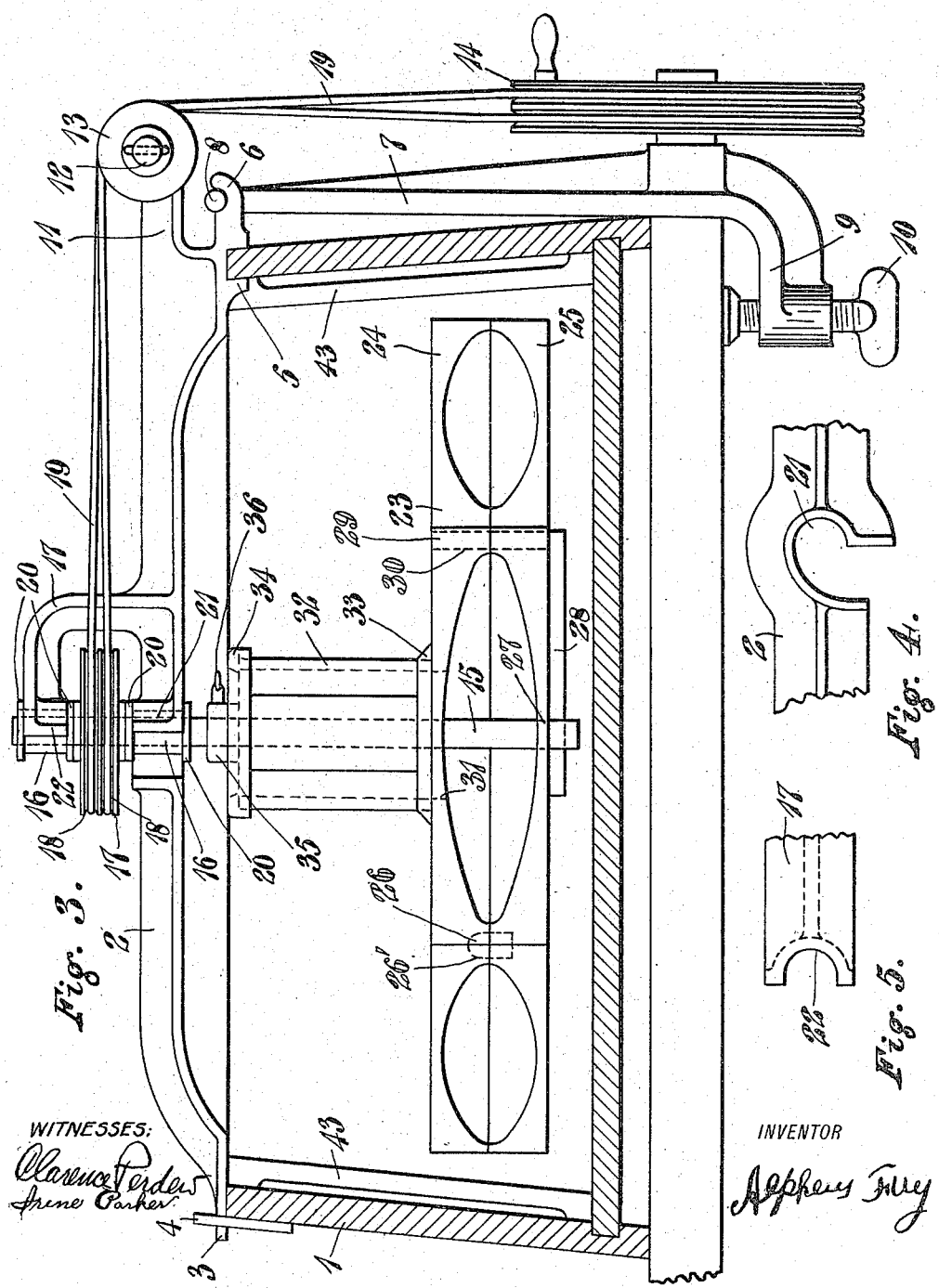

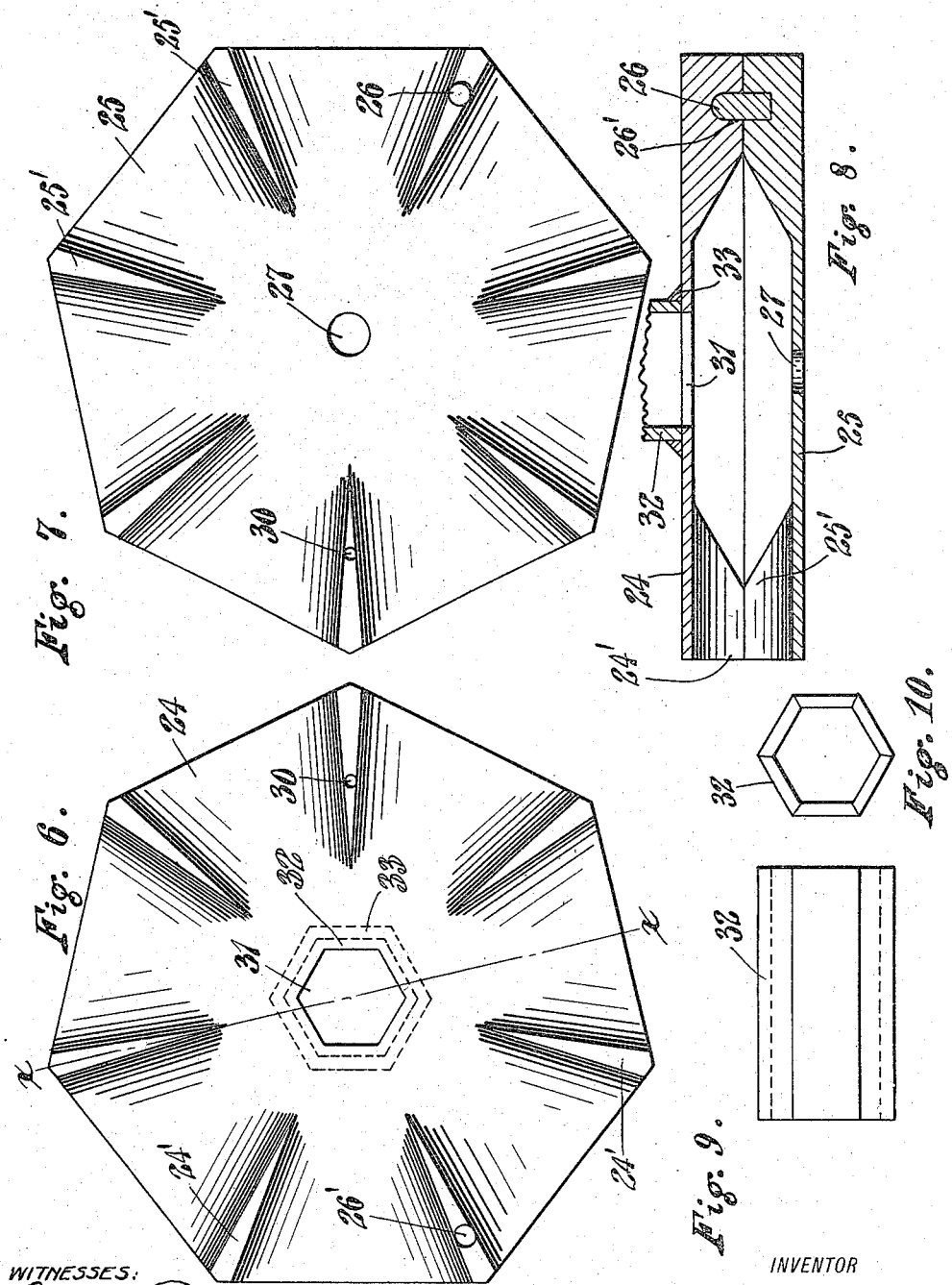

UNITED STATES PATENT OFFICE.

ALPHEUS FAY, OF LOUISVILLE, KENTUCKY.

APPARATUS FOR OPERATING UPON COMPOSITE SUBSTANCES.

1,177,176.   Specification of Letters Patent.   Patented Mar. 28, 1916.

Application filed August 30, 1915. Serial No. 48,057.

*To all whom it may concern:*

Be it known that I, ALPHEUS FAY, a citizen of the United States, and a resident of Louisville, in the county of Jefferson and State of Kentucky, have invented a certain new and useful Apparatus for Operating Upon Composite Substances, of which the following is a specification.

The object of my invention is to simplify the construction of apparatus of the above character, thereby making it more economical of production; and also to make the apparatus readily disassembled for storage or shipping; and to make each part so that when it is detached from the other parts it will very readily be cleaned, so that the entire apparatus may be kept thoroughly sanitary in use.

My invention consists in the combination of parts and in the details of construction and arrangement of parts as will herein be more fully described and claimed.

In the drawings: Figure 1 is a side elevation of apparatus embodying my invention; Fig. 2 is a detail of the outlet stopper; Fig. 3 is a vertical sectional elevation of the apparatus shown in Fig. 1; Fig. 4 is a fragmentary detail view of the middle of the bracket; Fig. 5 is a similar view of the end of the arm that receives the removable bearing; Fig. 6 is a bottom view of the upper impeller member; Fig. 7 is a top view of the lower impeller member; Fig. 8 is a cross section of the impeller on a line corresponding to the line $x$—$x$ of Fig. 6; Fig. 9 is a side elevation of the hollow shaft; and Fig. 10 is a plan view of the same.

The vessel 1 for containing milk elements to be operated upon is of wide and low formation providing an ample base, so that the vessel is readily secured in a substantial manner to a table or other supporting means.

The wide and low formation of the vessel in addition to providing a firm foundation therefor, prevents the substance operated upon therein from becoming deep in proportion to its diameter. Keeping the depth of the substance shallow in proportion to its diameter is a very important feature in the satisfactory operation of my apparatus, and for that reason I make my vessel for containing a substance to be operated upon of a wide and low formation, namely, the diameter being greater than its depth, in accordance with the method disclosed and claimed in my co-pending applications Serial No. 744,158, filed January 25, 1913, Serial No. 829,982, filed April 6, 1914, and Serial No. 11,355, filed March 1, 1915.

The bracket 2 is mounted across the top of the vessel resting on the rim thereof at opposite sides and having at one side a flat shank 3 that enters a cleat 4 fixed on the side of the vessel so that this end of the bracket 2 is held firmly down on the rim of the vessel. At the other side the bracket has a channel 5 fitting over the rim of the vessel and has, projecting outwardly, upwardly opening hooks 6. An arm 7 extends along the outside of the vessel, and its upper end has laterally projecting lugs 8 that engage in the upwardly opening hooks 6. This arm 7 at its bottom has a part 9 coming sufficiently far below the bottom of the vessel 1 to pass under the table or other object upon which the vessel is to be supported, and this terminal part 9 has a clamping screw 10 passing up through it to bear against the lower side of the top of the table or other object. With the shank end 3 of the bracket 2 fitting sungly under the cleat 4 and thus supporting and steadying this end of the bracket, and with the channel 5 fitting the rim of the vessel 1 snugly, it is thus possible to secure the bracket 2 firmly on the vessel 1 and at the same time secure the vessel firmly on the table or other object. This clamping means is disclosed and claimed in my co-pending application Serial No. 11,353, filed March 1, 1915.

Immediately above the part of the bracket 2 that has the channel 5 and hooks 6 is an outwardly projecting bearing 11 with lateral studs on which are journaled pulleys 13 each having two annular grooves in its periphery. On the lower part of the arm 7 a driving wheel 14 is rotatably mounted and it has two annular grooves in its periphery.

The shaft 15 is mounted vertically and extends down into the vessel having loose bearings 16 mounted in the middle of the bracket 2, respectively, below, and in an arm 17 above the driving pulley 18 having two grooves in its periphery and being fixed to said shaft 15 in any suitable manner. A single belt 19 passes around the two grooves of the fly wheel 14 and around the respective grooves 18 of the pulley 17 with two of its strands passing over the two grooves of one pulley 13 and its other two strands passing over the two grooves of the other pulley 13 at the side of the vessel. The loose bearings 16 are of spool shape, each having upper and lower flanges 20 which come above and below the bracket 2 and arm 17 and the parts of the bracket 2 and arm 17 are open at one side so that the middle or body part of this spool-shaped loose bearing 16 is adapted to fit in a substantially semi-circular vertical socket 21 or 22 in the bracket 2 or arm 17 on the side next to the driving wheel 14 and pulleys 13, said bearings 16 being held in their sockets by the tension of the driving belt 19. This tension is applied to the belt 19 in the process of assembling the apparatus and mounting it upon the table or other support 10. Thus it is necessary only to place the vessel upon the table, place the bracket upon the vessel, bring the shaft 15 with its loose bearing 16 into its socket 21, then pass the driving belt 19 around the pulleys 17 and 18 and down over the pulleys 13 and then apply the arm 7 with the driving wheel 14 and pass the belt 19 around the driving wheel, whereupon the bringing of the arm 7 into clamping position will tighten the belt 19 properly, if it is made of the proper length, giving it the required tension to properly drive the shaft 15 and also to hold the bearing in its position in the bracket 2.

The impeller 23 is composed of two members 24 and 25, the one superposed on the other and they preferably being of wood. These members are polygonal, being as here shown, made with seven sides and angles. The lower member is cut out on its upper side, and the upper member is cut out on its lower side in all parts except slim wedge-shaped parts 24' and 25', respectively, pointing radially inward from the angles, as is best seen in Figs. 6 and 7. Thus formed and brought together with these angles coinciding and these slim wedge-shaped parts forming the bearing means between the two members, a dowel pin 26 entering an opening 26' and holds the two members together.

The lower member 25 has an opening 27 down through which the shaft 15 extends. Below the lower side of the lower member 25 is a transverse pin 28 which passes through the shaft 15 and has an upright shank 29 that passes up through openings 30 in the members 25 and 24 at a point remote from the dowel pin 26, thus additionally holding the members together.

The upper member 24 has a larger opening 31 around which is fitted the lower end of the hollow shaft 32. As here shown, the opening 31 is hexagonal and the hollow shaft 32 is of hexagonal cross section, being made up of a series of thin pieces of wood, as best seen in Figs. 9 and 10, and the lower end fits inside a fillet 33 on the top of the upper member 24. An open cap 34 fits down over the upper end of the hollow shaft 32 with a hub 35 around the shaft 15 and a set screw 36 through this hub against the shaft. By this means the hollow shaft 32 is held firmly down on the impeller, which is held up on the shaft 15 by the pin 28.

Immediately above the bottom of the vessel there may be an opening 37 in the wall of the vessel which may be closed by a suitable plug 38 thus providing convenient means for withdrawing liquids from the vessel. This opening 37 is provided with a spout 39 adapted to fit around its lower side outside the vessel and project outwardly therefrom. This spout has a back plate 40 made to conform to the outside of the vessel, the spout 39 and plate 40 preferably being formed integral from a single sheet of metal. I provide for readily securing this spout 39 in its proper position on the side of the vessel by making the back plate 40 with a lower outwardly projecting flange 41 along its lower edge, there being sufficient extent of the back plate 40 below the spout 39 to receive the lower hoop 42 of the vessel 1 snugly between the lower side of the spout 39 and the upper side of the flange 41.

To coöperate with the impeller, brakes 43 may be mounted at opposite sides of the interior of the vessel and may project up into suitable sockets in the lower side of the bracket 2 adjacent to respective sides of the rim of the vessel, and these brakes have their lower ends bearing firmly on the bottom of the vessel and thus are held in position for operation.

From the foregoing description it will be seen that the apparatus may be disassembled to such an extent that no large or cumbersome parts are left to be packed or stored. In fact with this construction, all of the parts may be conveniently packed inside the vessel 1 for storage or shipping, thus greatly adding to the convenience and economy of handling the device. Furthermore, with the impeller and its tubular shaft made up of the detachable pieces as above described, all parts of these pieces are readily accessible for cleaning, and the entire apparatus is thus readily kept sanitary in use.

By providing the single endless driving belt 19 passing in two strands around the various pulleys, I secure a smooth and quiet driving operation, the two relatively small strands being much more flexible and efficient in their operation than would a single strand of the requisite thickness. At the same time, by providing in conjunction with these two strands of the single belt the separate pulleys above and below the bearing, the driving belt is caused to pull evenly above and below the bearing and thus make practicable the loose mounting of the bearings 16 for the shaft 15 in the bracket 2 and arm 17 as above described, in such a manner that the shaft with its bearing may be readily removed from the bracket. Another advantage of having the bearings 16 loose in the bracket 2 and arm 17 is that they are capable of slight rotation during the operation of the device, and at each repeated assemblage of the device they will be almost certain to be brought into new positions relative to the driving parts each time. Thus the wear due to the pulling of the driving belt 19 is not imposed continuously on any one side of the bearing, but is distributed therearound, causing the bearing to wear evenly and adding to the durability of the apparatus at the point where the greatest wear is imposed.

At the opposite side of the vessel a foot 44 may be fixed to the vessel near its bottom which may be engaged by an ordinary clamp 45 to hold the vessel down on the table or other supporting object at this side.

The impeller may be in the form of a simple horizontal flat polygonal block having a central bore down from its upper surface to near its lower surface, with radial passages extending out from this central bore to the surface of the vertical sides.

The impeller is shown as being septagonal, but it will be understood that it may have any convenient number of sides, and may have an interior passage for each such side. The diameter of the polygonal block is augmented rather than the vertical height or thickness, it being the purpose of the passages merely to conduct the air out to the periphery of the agitator from the central bore as it is supplied down through the hollow shaft 32 from the atmosphere under atmospheric pressure. The centrifugal action upon the liquid in the vessel, that is so set up this inflow of atmospheric air is chiefly produced by friction of the smooth upper and lower surfaces of the flat impeller rotated at a moderately high speed. In addition to this the undulating peripheral surface of the impeller sets up a huge number of extremely rapid vibrations in the surrounding liquid.

The use of the impeller with its flat sides, which are preferably plane and parallel to each other, depending for centrifugal action on the surrounding liquid entirely upon the frictional contact of said liquid with the smooth surfaces of the agitator, and the harmonic vibrations produced by the periphery marks a distinct departure in the art of constructing and operating apparatus to act centrifugally upon fluids.

Thus arranged, when the impeller is rotated, the liquid in contact therewith is thrown horizontally along the smooth surfaces of the agitator outward in every direction, causing a reduction of pressure of liquid in the central regions around outside the hollow shaft, with the result that atmospheric air under atmospheric pressure will pass downwardly into the liquid in such central regions until it reaches the upper surface of the agitator, where it will be carried outward along with the liquid that is being thrown outward by this frictional centrifugal action. The lower surface of the impeller, throwing the liquid outwardly along the surface and reducing the pressure of the liquid in the region between the agitator and the bottom of the vessel, serves to keep this region clear of such solid matter as may collect as a result of operation, as for instance, the collection of the butter particles in separating the butter from the other milk elements.

The liquid in the passages will also be thrown outwardly when the impeller is rotated, with the result that atmospheric air under atmospheric pressure will pass down on the inside of the hollow shaft 32 and out through the bores or passages as has been before alluded to. This liquid and the air flowing therewith out from the passages, as well as the liquid thrown out by the lower surface of the impeller, mingles, in the region around the periphery of the impeller, with the liquid thrown out by the upper surface of the impeller and with the air carried along said surface by said liquid. The tendency of these currents of liquid and air is upward adjacent to the walls of the vessel, and the brakes 43 will prevent simple whirling of the liquid in the vessel and so modify the direction of the liquid and air currents that a continuous smooth and steady roll of the liquid will occur all around the vessel. Owing to the absence of impact, the nature of the liquid and air currents will be such that their contact with the brakes will not result in any violent agitation. On the contrary, the movement of the liquid and air is so steady and smooth that an extremely uniform distribution of the air throughout the body of the liquid is effected. This uniform action throughout the liquid is comparable to the uniform activity of a body of liquid undergoing a gentle boiling process caused by heat applied to the liquid. Such a uniform distribution of air throughout a liquid I describe as true ebullition. This action, although familiar as obtained by the action of heat on a liquid, could not be utilized in the treatment of milk elements to obtain butter were it necessary to apply heat to the liquid sufficient to boil.

For separating butter from either sweet or sour cream, the liquid is placed in the vessel to about the height of the heavy dotted line, with the impeller about midway of the depth of the liquid as shown. It is important that the depth of the liquid above the impeller disk be not too great; otherwise the entrance of the air under atmospheric pressure will be hindered. It is also important that the distance between the impeller and the bottom of the vessel be not too great, because any considerable quantity of liquid too far below the impeller will not be affected by the aeration and other forces acting upon it, and will not have the butter separated from it, but will merely serve as a collecting plate for the butter separated from the upper liquid. On the other hand it is highly desirable that the impeller disk be of considerable diameter in order to obtain the greatest amount of centrifugal and centripetal action without impact and to operate on as large a quantity of liquid as is desired. For this reason the proper disposition of the body of liquid will be such that its width is considerably greater than its depth, as illustrated in the drawing, and it is for this reason that the vessel is made wide and low so that it is possible for all the forces applied to the liquid to act upon it in a uniform manner.

The milk elements should not have their temperature too low or too high, about 55° or 60° Fahrenheit being the preferred temperature. Such temperature is high enough to allow the operation to be performed quickly, and it is not so high as to cause the resulting butter granules to be too soft.

With this method butter may be produced in from three to ten minutes. Perceptible accumulation of butter will practically all take place during the last 15 or 60 seconds of the operation.

The butter will form in granules, and then the residue may be drawn off from the vessel and the granules salted by agitation and aeration of brine with the granules in the vessel.

When the salting operation is completed, the butter granules may be removed from the brine in the vessel, or the brine may be withdrawn from the butter granules, and the granules then removed from the vessel, after which the granules are worked or pressed into consistency for use.

The efficiency of operation is such that fully 90% of the butter fat of the cream is removed, and butter of purity of over 99% is obtainable, of firm texture and natural flavor.

Having fully described my invention, what I claim as new and desire to secure by Letters Patent is:

1. In a device of the character described, means for holding liquid to be operated upon, an impeller having a smooth uninterrupted surface and an undulating peripheral surface, and having a passage outward from its central region through the peripheral surface, means on the impeller to supply air to the central region and out through said passage, and means for rotating said impeller.

2. In a device of the character described, means for holding liquid to be operated upon, a polygonal impeller having a smooth uninterrupted surface, and having a passage outward from its central region through its peripheral surface, means on the impeller to supply air to the central region and out through said passage, and means for rotating said impeller.

3. In a device of the character described, means for holding liquid to be operated upon, a septagonal impeller having a smooth uninterrupted surface, and having a passage outward from its central region through its peripheral surface, means on the impeller to supply air to the central region and out through said passage, and means for rotating said impeller.

4. In a device of the character described, means for holding liquid to be operated upon, an impeller having opposite smooth and uninterrupted surfaces and an undulating peripheral surface, and having an opening through one of its smooth surfaces to the interior and having a passage from said opening out through its peripheral surface, a hollow shaft secured to the aforesaid smooth surface and communicating with the opening through said surface, and means for rotating said impeller.

5. In a device of the character described, means for holding liquid to be operated upon, a polygonal impeller having opposite smooth and uninterrupted surfaces, and having an opening through one of its smooth surfaces to the interior and having a passage from said opening out through its peripheral surface, a hollow shaft secured to the aforesaid smooth surface and communicating with the opening through said surface, and means for rotating said impeller.

6. In a device of the character described, means for holding liquid to be operated upon, two members with scooped-out sides secured together, forming an impeller having smooth uninterrupted upper and lower surfaces and a hollow interior, said members having short radially extending contacting parts defining passages outward from its central region through the peripheral surface, means on the impeller to supply air to the central region and out through said passages, and means for rotating said impeller.

7. In a device of the character described, means for holding liquid to be operated upon, two members with scooped-out sides secured together, forming an impeller having opposite smooth and uninterrupted upper and lower surfaces and a hollow interior and having an opening through one of its smooth surfaces to the interior, said members having short radially extending contacting parts defining passages from said opening out through its peripheral surface, a hollow shaft secured to the aforesaid smooth surface and communicating with the opening through said surface, and means for rotating said impeller.

8. In a device of the character described, means for holding liquid to be operated upon, an impeller having opposite smooth and uninterrupted surfaces and an undulating peripheral surface, and having an opening through one of its smooth surfaces to the interior and having a passage from said opening out through its peripheral surface, said impeller being made up of two members detachable around through a hollow shaft detachably secured to the aforesaid smooth surface and communicating with the opening through said surface, and means for rotating said impeller.

9. In a device of the character described, a polygonal impeller with smooth uninterrupted surfaces lying respectively above and below and in general directions substantially parallel to the plane of rotation of the impeller, the sides of the polygon traversing the circle of rotation of the impeller and being minimized in area relative to the smooth uninterrupted sides, said impeller having an opening through one of said smooth sides in the central region, and having passages from the said opening outward through the peripheral surfaces on the sides of the polygon, means for supplying air under atmospheric pressure to said opening and out through said passages, and means for rotating said impeller.

10. In a device of the character described, two members with scooped-out sides secured together forming a polygonal impeller with smooth uninterrupted surfaces lying respectively above and below and in general directions substantially parallel to the plane of rotation of the impeller, the sides of the polygon traversing the circle of rotation of the impeller and being minimized in area relative to the smooth uninterrupted sides, said impeller having an opening through one of said smooth sides in the central region, said members having short radially extending contacting parts defining passages from the said opening outward through the peripheral surfaces on the sides of the polygon, means for supplying air under atmospheric pressure to said opening and out through said passages, and means for rotating said impeller.

11. In a device of the character described, a polygonal impeller with smooth uninterrupted surfaces lying respectively above and below and in general directions substantially parallel to the plane of rotation of the impeller, the sides of the polygon traversing the circle of rotation of the impeller and being minimized in area relative to the smooth uninterrupted sides, said impeller having an opening through one of said smooth sides in the central region, and having passages from the said opening outward through the peripheral surfaces on the sides of the polygon, and being made up of two members detachable around through said passages, means for supplying air under atmospheric pressure to said opening and out through said passages, and means for rotating said impeller.

12. In a device of the character described, a polygonal impeller with smooth uninterrupted surfaces lying respectively above and below and in general directions substantially parallel to the plane of rotation of the impeller, the sides of the polygon traversing the circle of rotation of the impeller and being minimized in area relative to the smooth uninterrupted sides, said impeller having an opening through one of said smooth sides in the central region, and having passages from said opening outward through the peripheral surfaces on the sides of the polygon, and being made up of two members detachable around through said passages, means for supplying air under atmospheric pressure to said opening and out through said passages, a shaft for rotating said impeller, and means securing the impeller to the shaft and securing said members together.

ALPHEUS FAY.

Witnesses:
CLARENCE PERDEW,
IRENE PARKER.